United States Patent [19]

Rice, Jr.

[11] 3,841,133
[45] Oct. 15, 1974

[54] APPARATUS AND METHOD FOR SHAPING END TURNS OF COILS IN DYNAMO-ELECTRIC MACHINE CORES

[75] Inventor: Kenneth T. Rice, Jr., Lima, Ohio

[73] Assignee: Westinghouse Electric Corporation, Pittsburgh, Pa.

[22] Filed: Aug. 13, 1973

[21] Appl. No.: 387,994

[52] U.S. Cl. ................. 72/168, 29/205 D, 29/596, 29/606, 72/393
[51] Int. Cl. ............................................ B21b 15/00
[58] Field of Search .......... 29/596, 598, 606, 205 R, 29/205 D; 310/260, 270, 42; 72/355, 393, 168

[56] References Cited
UNITED STATES PATENTS

| | | | |
|---|---|---|---|
| 2,980,157 | 4/1961 | Rediger | 29/596 |
| 3,593,405 | 7/1971 | Hahn | 29/205 D |
| 3,629,925 | 12/1971 | Brown, Jr. et al. | 29/205 D |

Primary Examiner—Charles W. Lanham
Assistant Examiner—Carl E. Hall
Attorney, Agent, or Firm—G. H. Telfer

[57] ABSTRACT

A dynamoelectric machine core, such as a stator core, with coils located in core slots thereof is placed in fixed location on a center post within which there is an axially movable actuator that has at one end, proximate an end face of the core, shaping elements connected with the actuator and radially movable in accordance with the axial movement of the actuator for forcing end turns radially outward over the core end face. The shaping elements collectively have the general configuration of a cone whose apex receives a core whose end turns are to be shaped even though some end turns extend across the core bore. The lowermost set of end turns is shaped by the placement of the core on the post which has at its lower end an encircling member tapering out from the major cylindrical surface of the post while at the other end the shaping elements respond through movement of the actuator to open up and extend radially outward over the core end face.

15 Claims, 4 Drawing Figures

3,841,133
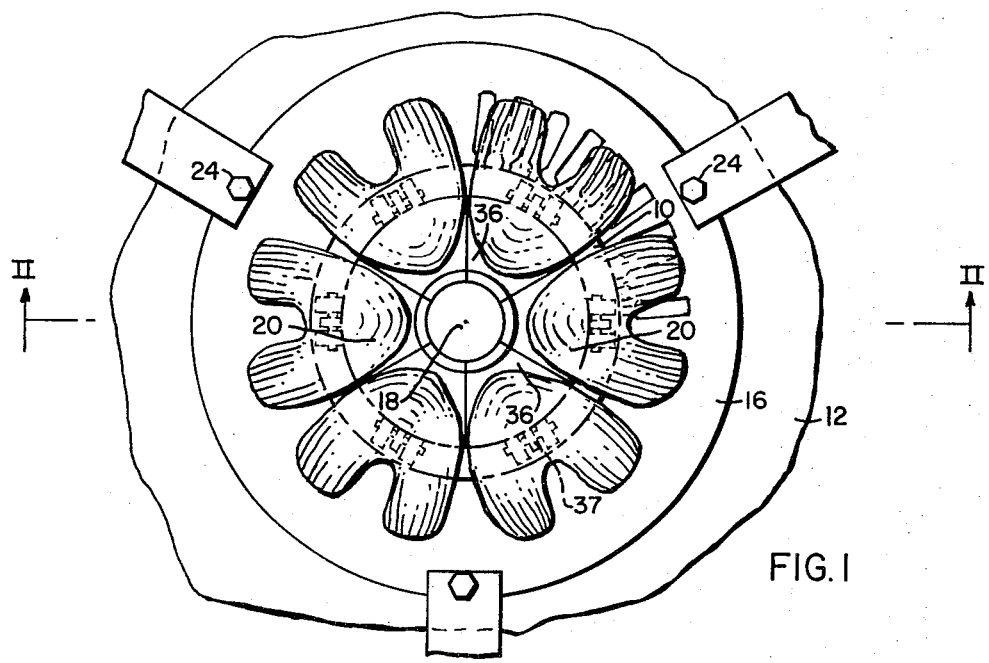
FIG.1
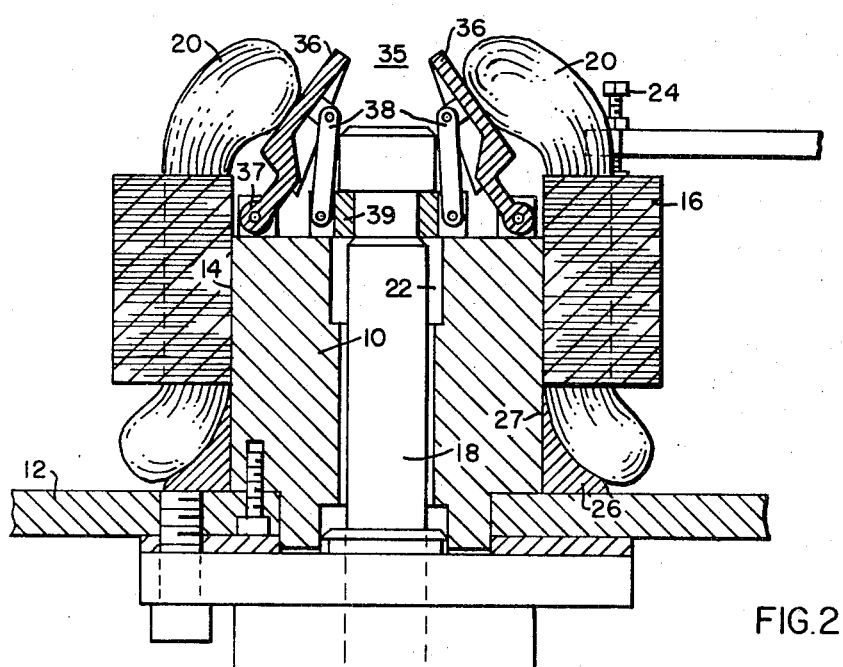
FIG.2
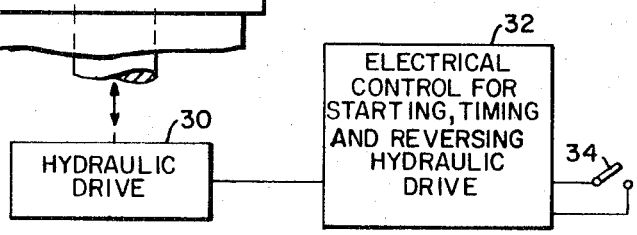

APPARATUS AND METHOD FOR SHAPING END TURNS OF COILS IN DYNAMO-ELECTRIC MACHINE CORES

BACKGROUND OF THE INVENTION

This invention relates to coil end turn shaping apparatus and methods for mechanically shaping the end turns of coils of a wound core and particularly to dynamo-electric machine fabrication requiring stators having a plurality of layers of coils, each in a plurality of turns.

Several different types of techniques are conventionally employed for the introduction of coils into motor stators. While the invention has more general applicability, what is of primary interest is the production of the stators of fractional horsepower motors characterized by windings having numerous turns of flexible wire that are subject to considerable movement. The cores are generally cylindrical elements having axial core slots extending from the inner surface thereof. Coils are sometimes placed in the slots by hand but increasingly are placed by apparatus that includes in-place winders for directly winding the coils in their desired location and other forms of apparatus in which the coils are formed apart from the core itself and then transferred to the desired location in the core.

One technique for performing such operations is that in which separately wound coils are placed in the core by the use of a coil inserter which is an apparatus having a plurality of upstanding fingers or blades with slots between them corresponding to the core slot openings. Placement of coils on the inserter in their desired relative location, and then placement of an empty core over the inserter followed by stripping the coils from the inserter effects the placement of the coils in the core. While in-place hand or machine winding generally results in a finished wound core requiring little if any coil end turn shaping, the insertion type winding, while highly beneficial in terms of speed of production, results in cores that have some coil end turns laid across the bore of the core or which interfere with access to some core slots intermediate those which already contain windings. Those intermediate slots are frequently required for the location of additional coils.

While the number and location of coils varies widely in various small motors some idea of the nature of the need for end turn shaping may be better understood by considering that a typical stator may comprise a core having a length of about 2 inches having 36 core slots and inner and outer diameters of 3½ in. and 6-5/16 in., respectively. That core must accommodate a main winding of four and six electrical poles (for two speeds), which includes 3 coils for the winding of each pole, and each coil may contain approximately 40 turns. Such a core may be for a one-half horsepower motor normally applied for such purposes as driving a washing machine. After placement of the main winding there is then required the placement of the starter winding which may be in four pole groups and requires location in slots intermediate those in which the main winding is located. The large number of wire turns of the main winding, particularly with the use of the insertion technique, can easily result in end turns of the coils, that is the coil portions that extend outside the slots at the core end faces, that are located partially over the bore of the core and hence would interfere with placement of a rotor therein, or at least extend over intermediate core slots required for placement of starter windings. Therefore, some technique of end turn shaping must be applied.

Various end turn shaping techniques have been previously known and used with various capabilities and limitations. One such technique is that of electro-shaping and involves the application of a pulse of electrical current to the coil or coils in the core which causes by electro-magnetic reaction a force to be induced on those end turns that are not fixed in location so that they lay back on the core end face. This technique is successful in producing the desired results. It is, however, relatively expensive in terms of equipment and for the successful use of the technique on commercially available equipment the end turns have to be clear of the bore before electro-shaping which means that some hand shaping has to be initially performed before the electro-shaping process may be used.

There are machines known that employ hooks in order to pull out end turns to a location on the core face. These machines tend to be complex and expensive and can result in damage to the wire.

There is also known a form of apparatus which comprises a rod having a rubber plug at each end in an arrangement similar to the dumbbell. The dumbbell is located in a core such that the rubber plugs occur proximate the core faces. Axial force is applied to the plugs so that they tend to spread out radially and force the end turns out over the core faces. This technique also requires that the end turns be out of the bore of the core before it may be implemented.

There is also known apparatus which comprises a cylinder fitting within the bore of a wound core and has elements projecting therefrom like fins which are radially reciprocating for compacting coil turns within core slots. This apparatus requires clearance of the bore before it can be inserted.

The present invention came about from an effort to design and develop coil end turn shaping apparatus and methods for end turn shaping that do not require that the end turns be initially pushed back from the bore of the core and which effectively and efficiently accomplishes the end turn shaping function by apparatus that is economical in its construction and operation.

SUMMARY OF THE INVENTION

In accordance with this invention a dynamoelectric machine core, such as a stator core, with coils located in core slots thereof is placed in fixed location on apparatus having a center post within which there is an axially movable actuator. At one end of the actuator, proximate an end face of the core, shaping elements connected with the actuator and radially movable in accordance with the axial movement of the actuator are provided for forcing end turns radially outward on the core end face. The shaping elements, collectively, have the general configuration of a cone whose apex receives a core whose end turns are to be shaped even though some end turns extend across the core bore. The lower set of end turns is shaped by the placement of the core on the post which has at its lower end an encircling member tapering out from the major cylindrical surface of the post while at the other end the forming element responds through axial movement of the actuator to open up and extend radially outward over the core end face. Additional shaping elements may also be provided at a radially outward location for limiting the extent of radially outward movement of the turns by the first set of shaping elements.

The general operation of apparatus in accordance with this invention may be better understood from the fact that those designing and working with such apparatus often refer to it as a "tulip press." This nickname has been applied because the end turn shaping segments open up like the petals of a flower, such as a tulip, in performing their shaping function.

Of primary interest is a form of apparatus in which the movable shaping segments are actually applied only to the end turns at one end of the core. The reason for this is that the cores with which the invention is advantageously applied includes those wound by the insertion technique. Characteristic of this technique is that at one end of the core, the lower end as the core is disposed in the inserter, the coils are better formed in their original disposition than they are at the other end. There may be shaping required but in accordance with this invention the turns at the lower end are shaped in the placement of the core onto the apparatus by the encircling flared out member referred to above. The configuration of the conical segments is such that the point of the cone may be arbitrarily sharp in order to enter the center of the coil end turns even where such end turns extend across the bore to some extent.

In placing the core on the apparatus an operator preferably moves the core over the cone of shaping segments which enters into the end turns at the lower end of the core so that they may pass around the center post and be shaped by the encircling member at the bottom end. The cone of the shaping elements also enters into the end turns at the upper end of the core. When the core is in this fixed position the operator actuates an actuator extending through the center post supporting the core so that the axial movement results in the spread of the conical segments and they open up like flower petals to push back the end turns. Upon closure of the shaping segments, which may be after a timed interval, the core may be removed and is ready for further assembly.

It is apparent from the foregoing that the invention may be readily applied in various alternate forms. The general concept involving the use of the conical segments opening up to push back end turns at one end of the core may equally be applied to apparatus that comprises a center support cylinder with such conical configurations at both ends with a lock system to maintain the core in place. Furthermore, while the apparatus may be implemented in a variety of orientations it is believed most suitable in preferred form that the apparatus be arranged in substantially vertical orientation merely for operator convenience in placement and removal of cores thereon.

The actuation of the apparatus to perform its desired functions may be accomplished by a variety of means including manual, hydraulic and pneumatic drive systems. For convenience, a drive means initiated by an electrical signal that the operator can provide at a foot pedal, is preferred. There may be included a time delay so that after a predetermined interval of having the segments open in the radially outward position for shaping end turns they are then automatically closed without further operator involvement and the operator merely lifts off the core.

It will be further apparent that mechanical, including automatic, means could be employed for the placement or removal of cores on the apparatus for shaping the end turns. The invention has, however, been successfully implemented with considerable savings in overall production costs while employing hand operations for placement and removal of the cores and initiation of the shaping action. The apparatus of this invention is sufficiently simple and economical that it is practical to provide such an apparatus for each core of interest where various core sizes and numbers of windings are produced.

BRIEF DESCRIPTION OF THE DRAWINGS

FIG. 1 is a plan view of an embodiment of apparatus in accordance with this invention prior to actuation of the shaping elements;

FIG. 2 is an elevational view in section of the apparatus of FIG. 1 taken along line II—II;

DESCRIPTION OF THE PREFERRED EMBODIMENTS

Figure 3:
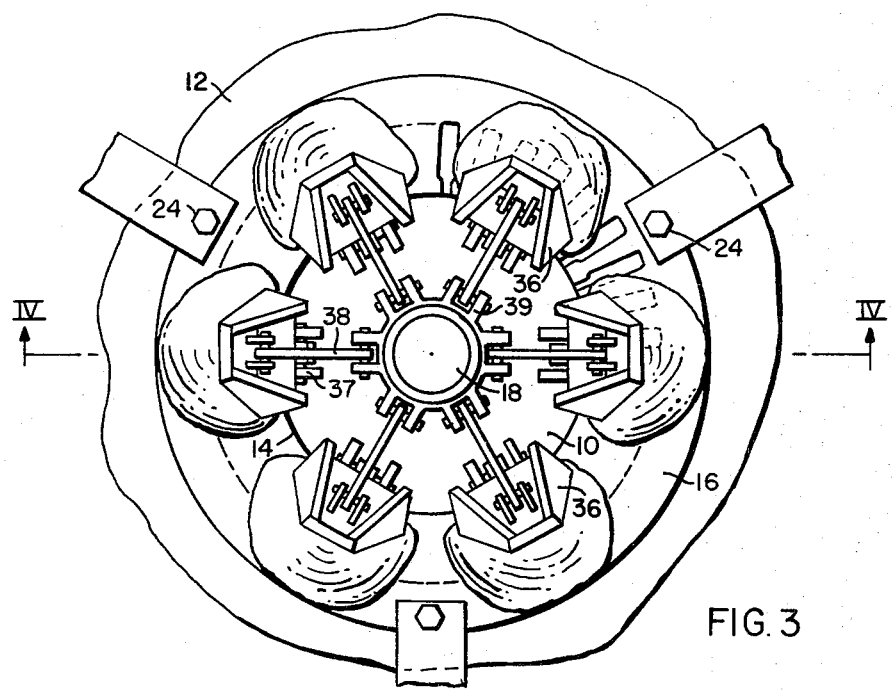
FIG. 3 is a plan view of the apparatus of FIG. 1 but after the coil end turn shaping elements have been actuated; and, FIG. 4 is an elevational view in section of the apparatus of FIG. 3 taken along the line IV—IV.

Referring now to the drawing, an embodiment is shown of apparatus in accordance with the present invention. The apparatus includes a means for locating a wound core in a fixed position. The means for locating the core in this embodiment comprises a fixed cylindrical post 10 that is secured to a frame 12. The post 10, sometimes referred to as a center post, has a smooth external cylindrical surface 14 on which a core 16 slidably fits. In accordance with this preferred embodiment the center post 10 is fixed in a substantially vertical orientation. As shown the post is exactly vertical, however some angle up to about 45° from vertical might be employed while generally preserving the operator convenience of being able to place cores on the post in a generally downward manner. Orientations of the apparatus other than vertical may also be employed.

The apparatus also includes an actuator means 18 located to be centrally disposed within end turns 20 of a wound core when a core is in its fixed position. The actuator means 18 is movable in relation to the fixed position of the core. In the illustrated embodiment, the actuator means 18 comprises a member, here a cylindrical member though not necessarily so, located axially within the post 10. Here the cylindrical member 18 runs in a sleeve bearing 22 that is located in the post interior surface. Rotation of actuator 18 is not essential to the practice of the invention but rather it is the case that the actuator 18 has a degree of permissible axial movement in relation to the post.

In addition to the center post 10, the securing of a core 16 in a fixed position may be and preferably is aided through the use of one or more hold down arms 24 which may be swung around over the core upon placement of the core on the center post 10 in order to prevent the core from bouncing upward by reason of the turns at the lower end. That is, upon placement of a core on the post the operator may swing the hold down arm or arms 24 in place.

An additional part of the means for holding a core in a fixed position in this embodiment is an encircling collar 26 near the lower end of the post 10 which is of a generally tapered configuration about which more will be said later. The encircling collar 26 has an upper edge 27 that may be of small dimension but is sufficient for the core to rest on.

Associated with the actuator 18 is a drive means 30 and control means 32 that are schematically illustrated in FIG. 2. Here the drive means 30 is indicated to be a hydraulic drive for raising and lowering the cylinder and has associated with it an electrical control 32 for starting, timing and reversing the hydraulic drive.

The particular means for implementing the drive and control function may be variously configured in accordance with known machine tool practices for effecting the relatively simple movement required by the apparatus. Here the control means is provided with a switch 34 that may be in a foot pedal for the operator's use.

Figure 4:
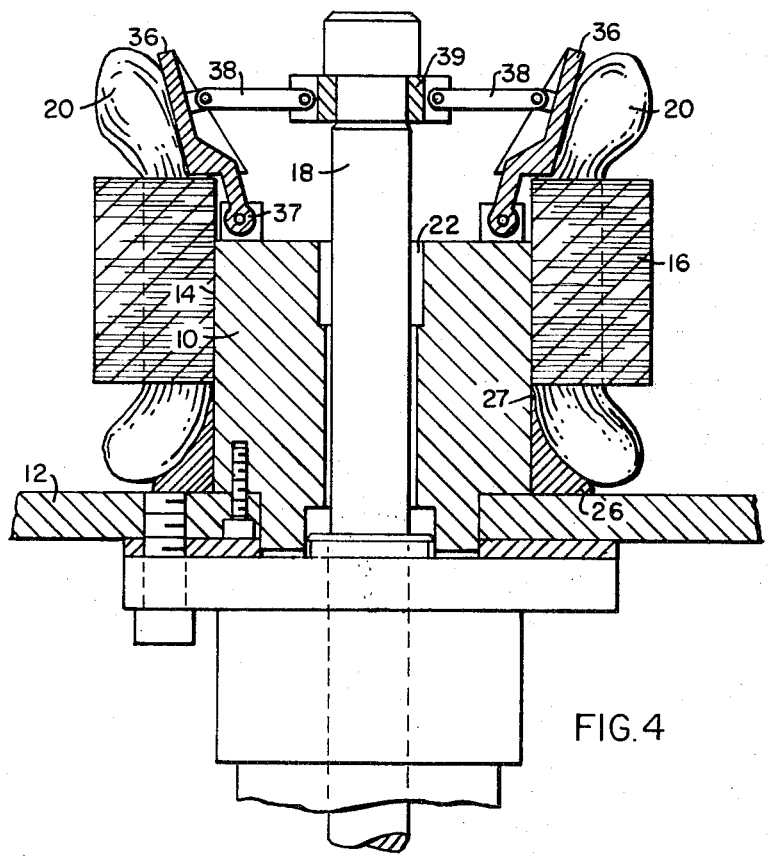

A shaping means 35 is connected with the actuating cylinder 18 for movement therewith to force end turns radially outward over an end face of a core 16 upon the axial movement of the actuator. The shaping means comprises at least one element 36 and preferably, as shown, a circular array of elements 36 that have a first radially inward position when the axial member 18 is in a first axial position as illustrated in FIGS. 1 and 2 and which have a second radially outward position when the axial member is in a second axial position as illustrated in FIGS. 3 and 4.

In the embodiment shown the elements 36 of the shaping means have exterior surfaces generally forming segments of a cone that is located within a volume that is an axial extension of the cylindrical post 10. When the shaping elements 36 have been moved into their second position (FIGS. 3 and 4) at least portions of those exterior surfaces are extended outward and over the locus of a core end face for forcing out the end turns.

In this embodiment the movement of the shaping elements 36 is effected by provision of the relatively simple pivoting action. The shaping elements 36 each have a first point of connection 37 to the fixed post at radially outward locations thereon and this is a pivoting connection that permits pivoting those elements in a radially outward direction. The shaping elements 36 are connected to the movable actuator 18 through a linkage means 38 which here comprises for each element a toggle link secured at one end to a collar 39 on the actuator with pivoting motion thereat. The other end of each toggle link 38 is secured to a location on the shaping element 36 that is radially inward from the location secured to the post. Therefore, as shown in FIG. 2, in the first position in which the shaping elements are closed so as to afford convenient placement of a core on the post, the toggle links 38 are in a generally axial position. Then upon the actuation of the mechanism in order to cause movement of the actuating cylinder 18 in an upward direction, the toggle links are forced outwardly at their upper ends to the positions as shown in FIG. 4 along with which the shaping elements are forced outwardly thus accomplishing what appears similar to the opening of the petals of a flower as has been previously referred to.

Although various numbers of shaping elements 36 may be employed it has been found preferable that their number be at least equal to the number of pole groups of windings of the wound core whose end turns are shaped. The tapered or cone like configuration of the shaping elements 36 in their closed position, as shown in FIGS. 1 and 2, is significant in that it permits ease of placement of a core 16 on the apparatus even though the core as presented to the operator of this apparatus may have end turns that extend partially within the bore (or an axial projection thereof). It will be further noted that the cone configuration may be provided with a sharper point by ends of segments 36 that fit closer together than those illustrated in the embodiment if required to make it easier for the placement of the core on the apparatus. It is to be understood therefore that upon placement of a core on the center post 10 and forcing it down to the extreme position afforded by the post and the encircling collar that the lower most end turns are shaped by the tapered configuration of the encircling collar 26. It is not necessary that the operator turn the core over in order to place it again on the apparatus and shape those end turns by the upper end turn shaping elements 36.

Shaping element 26 need not be fixed to post 10 or frame 12 and may serve its purpose by having a sliding fit with the post and rest against the frame. This facilitates height adjustment of the apparatus. That is, one or more spacer rings may, if desired, be slid over the post 10 between member 26 and frame 12 to elevate the core to the proper position for shaping by means 35. This permits a degree of versatility to accommodate on the same apparatus cores of differing length.

The method of shaping end turns in accordance with this invention therefore comprises the steps of placing by some means, including mechanical means or manually, a wound stator core, whose end turns have not been shaped and which partially extend within the bore of the core, onto the fixed cylindrical center post in a sliding fit and shaping the end turns at one end of the core by forcing them radially outward during the placing of the core on the post merely by applying force axially to the core until those end turns reach the tapered outward member. Then with the core fixed in location the method of the invention is carried out by actuating the axially movable member within the center post to cause the shaping elements 36 to move radially outward at the upper end of the core to shape the end turns at that end over its related core end face. After actuating such elements, the movable member is then caused to return to its original position and the shaping elements 36 correspondingly to their original position. Then the core is removed from the post. The operations of core movement required by this method are conveniently carried out by placing the core on the post in a substantially vertical direction.

It will be understood that the apparatus as described is merely exemplary of a presently preferred form of the invention which may be variously modified within the teachings presented herein. The means by which the shaping elements are associated with the actuating cylinder may include various other configurations of levers, wedges, cams, or toggle links in addition to that specifically disclosed.

A further modification of the invention has been found particularly helpful in those instances where the motor core whose end turns are to be shaped has relatively fine turns of wire which are susceptible to deformation. In such cases it is desirable to provide outside the core perimeter shaping elements that are movable in synchronism with the actuating cylinder and are in a first radially outward position until actuation at which time they move in and restrain the radially outward movement of the end turns.

I claim:

1. Coil end turn shaping apparatus, for wound cores such as motor stators, comprising:

means for locating a wound core in a fixed position;

actuator means mounted to be axially movable in relation to said fixed position;

shaping means connected with said actuator means and at least partially movable therewith for forcing end turns radially outward over an end face of a core upon a predetermined movement of said actuator means;

said means for locating comprising a fixed cylindrical post; said actuator means comprising a member located axially within said post; and said shaping means comprising at least one element that has a first radial position when said axial member is in a first axial position and has a second radial position when said axial member is in a second axial position.

2. The subject matter of claim 1 wherein: said post of said means for locating has a smooth external cylindrical surface on which a core slidably fits.

3. The subject matter of claim 1 wherein: said shaping means comprises a plurality of elements which when in said first radial position have exterior surfaces generally forming segments of a cone located within a volume that is an axial extension of said post and when in said second radial position at least portions of said exterior surfaces extending over the locus of a core end face.

4. Coil end turn shaping apparatus for mechanically shaping end turns of coils of a wound dynamoelectric machine core, which core has a hollow cylindrical configuration with axially extending coil slots extending within an inner core surface, comprising:

a center post having an outer surface for location of a core thereon;

a movable member within said center post and axially movable in relation thereto;

a plurality of end turn shaping members connected to said movable member and movable therewith to be moved radially outward upon axial movement of said member.

5. The subject matter of claim 4 wherein: said end turn shaping members have exterior surfaces that form segments of a cone when said cylindrical member is in a first axial location and which pivot outwardly therefrom for forcing end turns over a core end face.

6. The subject matter of claim 5 wherein: said end turns shaping members each have a point of pivotal connection to said center post and a connecting member is pivotally joined to said movable member and to each said shaping member at a location toward the cone apex from said point of connection to said center post.

7. The subject matter of claim 4 wherein: said center post is fixed in a substantially vertical orientation; a member encircles said post proximate the lower end thereof and has an exterior surface that flares radially outward from said outer surface of said post toward the bottom thereof, said encircling member serving to force radially outward lower end turns on a core upon placement of the core on said post while said end turn shaping members are located for shaping end turns at the upper end of the core.

8. The subject matter of claim 4 further comprising: an additional plurality of end turn shaping members connected to said movable member and located radially outward from the location of said first mentioned plurality of end turn shaping members, and said additional plurality of members are movable with said movable member in a radially inward direction and act to limit outward movement of end turns initiated by said first mentioned plurality of members.

9. The subject matter of claim 4 wherein: the number of said plurality of end turn shaping members is at least equal to the number of pole groups of windings of the wound core.

10. Apparatus, for shaping the end turns of coils in a stator core for a dynamoelectric machine, comprising:

a fixed frame;

a cylindrical post supported by said frame in a substantially vertical direction;

an actuator member located within said post and mounted for axial movement therein;

a plurality of shaping elements, each of said shaping elements being pivotally joined to said post at the vertically upward end thereof, linkage means located between said elements and said actuator, said linkage means holding said elements uniformly in a radially inward position when said actuator is at a first position axially downward in said post, said elements shaped so that in said radially inward position they have exterior surfaces generally comprising segments of a cone whose base is at said post upward end and whose apex is vertically upward therefrom, said linkage means also holding said elements uniformly in a radially outward position when said actuator is at a second position axially upward in said post.

11. The subject matter of claim 10 further comprising: means for moving said actuator between said first and second positions.

12. The subject matter of claim 11 further comprising a tapered member encircling said center post proximate the lower end thereof with an exterior surface that flares radially outward and down from said cylindrical surface of said post.

13. A method of shaping the end turns of a cylindrical dynamoelectric machine stator core comprising the steps of:

placing a wound stator core, whose end turns have not been shaped, on a fixed cylindrical post in a sliding fit;

shaping the end turns at one end of the core by forcing them radially outward during the placing of the core on said post by applying force axially to the core until the core reaches a tapered outward member extending from the cylindrical surface of the post;

actuating, after the core is placed and the end turns at one end have been shaped, an axially movable member within said center post to cause shaping elements to move radially outward at the other end of the core to shape the end turns at that end.

14. The subject matter of claim 13 further comprising: after said actuating, causing the return of the movable member and the shaping elements to their original positions and removing the core from the post.

15. The subject matter of claim 14 wherein: the placing of said core on said post is in a substantially vertical direction.

* * * * *